United States Patent
Jung et al.

(10) Patent No.: US 9,351,161 B2
(45) Date of Patent: May 24, 2016

(54) METHOD AND APPARATUS FOR PERFORMING HANDOVER IN CONSIDERATION OF AUTHENTICATION PROCEDURE

(75) Inventors: Inuk Jung, Anyang-si (KR); Yongho Kim, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1011 days.

(21) Appl. No.: 13/516,698

(22) PCT Filed: Dec. 8, 2010

(86) PCT No.: PCT/KR2010/008756
§ 371 (c)(1),
(2), (4) Date: Nov. 14, 2012

(87) PCT Pub. No.: WO2011/074825
PCT Pub. Date: Jun. 23, 2011

(65) Prior Publication Data
US 2013/0059564 A1    Mar. 7, 2013

Related U.S. Application Data

(60) Provisional application No. 61/287,672, filed on Dec. 17, 2009, provisional application No. 61/306,554, filed on Feb. 22, 2010.

(51) Int. Cl.
*H04W 12/06* (2009.01)
*H04W 36/00* (2009.01)
*H04W 36/14* (2009.01)

(52) U.S. Cl.
CPC .......... *H04W 12/06* (2013.01); *H04W 36/0038* (2013.01); *H04W 36/14* (2013.01)

(58) Field of Classification Search
CPC ...... H04W 12/00; H04W 12/04; H04W 12/06; H04W 12/08; H04W 36/00; H04W 36/0033; H04W 36/0038; H04W 36/14
USPC ........................... 455/410–411, 436; 370/331
See application file for complete search history.

(56) References Cited

U.S. PATENT DOCUMENTS

2005/0277417 A1*  12/2005  Yoon ................. H04W 36/0033
                                                    455/436
2005/0282548 A1*  12/2005  Kim .................. H04W 36/0055
                                                    455/436

(Continued)

FOREIGN PATENT DOCUMENTS

KR    10-2005-0081324    8/2005
KR    10-2008-0007290    1/2008

*Primary Examiner* — Michael Mapa
(74) *Attorney, Agent, or Firm* — Lee Hong Degerman Kang & Waimey; Jonathan Kang; Jeffrey Lotspeich

(57) ABSTRACT

A handover performing method and apparatus are provided to allow a terminal to effectively perform handover when it moves from a cell of a base station supporting a legacy system to a cell of a base station supporting an advanced system. The method for performing handover by a terminal, includes: acquiring information regarding a target base station through scanning; transmitting a ranging request message including indication information indicating direct handover to the target base station to the target base station; receiving a ranging response message including a handover procedure optimization flag from the target base station; and performing a network entry procedure toward the target base station according to the handover procedure optimization flag, wherein, in the network entry procedure, a key agreement procedure with the target base station is performed by using first authentication information which has been used in a connection with a serving base station.

10 Claims, 3 Drawing Sheets

(56) References Cited

U.S. PATENT DOCUMENTS

2008/0089294 A1* 4/2008 Shon .................. H04L 63/0869 370/331

2009/0073916 A1 3/2009 Zhang et al.
2010/0098247 A1* 4/2010 Suumaki ............... H04L 9/0866 380/44

* cited by examiner

METHOD AND APPARATUS FOR PERFORMING HANDOVER IN CONSIDERATION OF AUTHENTICATION PROCEDURE

CROSS-REFERENCE TO RELATED APPLICATIONS

This application is the National Stage filing under 35 U.S.C. 371 of International Application No. PCT/KR2010/008756, filed on Dec. 8, 2010, which claims the benefit of U.S. Provisional Application Ser. No. 61/306,554, filed on Feb. 22, 2010, and 61/287,672, filed on Dec. 17, 2009, the contents of which are all incorporated by reference herein in their entirety.

TECHNICAL FIELD

The present disclosure relates to a method and apparatus for supporting mobility of a terminal in a communication system and, more particularly, to a method and apparatus for performing handover by a terminal between base stations in a communication system.

BACKGROUND ART

Handover or handoff refers to a procedure supporting smooth maintaining of communication of a terminal moving between cells during call communication. Handover is classified into three types: soft handover; softer handover; and hard handover. Soft handover refers to handover performed while signals are simultaneously received from several base stations. Softer handover refers to handover performed between different sectors of the same base station, during which signals from the different sectors are simultaneously received. Hard handover refers to handover performed while selectively receiving only one base station signal at a moment.

For example, IEEE 802.16e standard defines four handovers: hard handover (HHO), optimized hard handover (OHHO), fast base station switching (FBSS), and macro diversity handover (MDHO). In this case, however, only the HHO and OHHO are included as essential functions in a system profile defined by WiMAX Forum for mobile WiMAX authentication.

The HHO is a scheme for releasing a connection with a base station on service (i.e., a serving base station) before the terminal establishes a connection to a new base station (i.e., a target base station) like the existing hard handover scheme, which can be understood as a handover scheme of 'break before make', 'break before entry' or 'break before establishment'. The OHHO is a scheme optimizing the HHO, which enhances a service continuity and minimizes a call interruption or the like by reducing a handover switching time by optimizing the general HHO. The MDHO is a scheme for establishing a connection to a new base station before the terminal releases the connection with the current base station like the existing soft handover scheme, which can be understood as a handover scheme of 'make before break', 'entry before break' or 'establishment before break'. The FBSS is a handover scheme having a medium performance and complexity of those between the HHO and the MDHO.

Meanwhile, IEEE 802.16m is a standard aiming at satisfying all the advanced requirements for IMT-Advanced system, the next-generation 4G mobile communication standard, while maintaining the compatibility with the IEEE 802.16e system. When the compatibility between the legacy system and the advanced system is to be maintained, mobility of the terminal between both systems is a major technical issue. For example, in an environment in which an IEEE 802.16e base station (i.e., a legacy base station (BS)) and an IEEE 802.16m base station (i.e., an advanced BS) coexist, handover between the IEEE 802.16e BS and the IEEE 802.16m BS must be smoothly performed. In particular, handover must be smoothly performed when the IEEE 802.16m BS does not support the IEEE 802.16e system.

DISCLOSURE OF INVENTION

Solution to Problem

Therefore, an object of the present disclosure is to provide a method and apparatus for performing handover capable of shortening a time required for performing handover or a service delay time by optimizing a handover procedure of a terminal between base stations.

To achieve these and other advantages and in accordance with the purpose of the present disclosure, as embodied and broadly described herein, there is provided a method for performing handover by a terminal, including: acquiring information regarding a target base station through scanning; transmitting a ranging request message including indication information indicating direct handover to the target base station to the target base station; receiving a ranging response message including a handover procedure optimization flag from the target base station; and performing a network entry procedure toward the target base station according to the handover procedure optimization flag, wherein, in the network entry procedure, a key agreement procedure with the target base station is performed by using first authentication information which has been used in a connection with a serving base station.

In the key agreement procedure, the terminal may include the first authentication information in a key agreement message transmitted to the target base station and transmits the same, and the target base station may authenticate the terminal on the basis of the first authentication information.

The first authentication information may be a cipher-based message authentication code (CMAC) tuple.

In performing the network entry procedure, when the target base station cannot acquire a security context of the terminal from the serving base station or when the target base station cannot authenticate the terminal according to the first authentication information, a full network entry procedure toward the target base station may be performed, and when the target base station can acquire the security context of the terminal from the serving base station and when the target base station can authenticate the terminal according to the first authentication information, a network reentry procedure toward the target base station may be performed.

The key agreement procedure may include: receiving a first key agreement message including a base station random number from the target base station; transmitting a second key agreement message including the first authentication information, the base station random number, and a terminal random number to the target base station; and receiving a third key agreement message including second authentication information generated by the target base station, the base station random number, and the terminal random number from the target base station.

The third key agreement message may further include a security association identifier (SAID) identifying the type of security communication between the terminal and the target base station.

The handover procedure optimization flag may be set based on whether or not the target base station can acquire the security context of the terminal from the serving base station.

The handover procedure optimization flag may be set to perform the full network entry procedure toward the target base station when the target base station cannot acquire the security context of the terminal from the serving base station, and may be set to omit an authentication process according to an extensible authentication protocol (EAP) when the target base station can acquire the security context of the terminal from the serving base station.

In performing the network entry procedure, at least one of a capability negotiation for negotiating about the capability which is supported by the terminal or which is desired to be used by the terminal and the capability which can be supported or allowed by the target base station, and a registration to the network of the target base station may be performed.

The serving base station may be a base station supporting only an IEEE 802.16e system, and the target base station may be a base station supporting only an IEEE 802.16m system.

To achieve these and other advantages and in accordance with the purpose of the present disclosure, as embodied and broadly described herein, there is also provided a method for performing handover by a target base station, including: receiving a ranging request message including indication information indicating direction handover to the target base station from a terminal; determining a handover procedure optimization flag according to whether or not security context of the terminal can be acquired from a serving base station; transmitting a ranging response message including the handover procedure optimization flag to the terminal; and performing a network entry procedure of the terminal toward the target base station according to the handover procedure optimization flag, wherein in the network entry procedure, a key agreement procedure with the terminal is performed by using first authentication information which has been used by the terminal in its connection with the serving base station.

In the key agreement procedure, the terminal may include the first authentication information in the key agreement message transmitted to the target base station and transmit the same, and the target base station may authenticate the terminal on the basis of the first authentication information.

In performing the network entry procedure, when the target base station cannot acquire a security context of the terminal from the serving base station or when the target base station cannot authenticate the terminal according to the first authentication information, a full network entry procedure toward the target base station is performed, and when the target base station can acquire the security context of the terminal from the serving base station and when the target base station can authenticate the terminal according to the first authentication information, a network reentry procedure toward the target base station may be performed.

To achieve these and other advantages and in accordance with the purpose of the present disclosure, as embodied and broadly described herein, there is also provided a terminal performing handover may include: a controller acquiring target base information through scanning, selecting a target base station, and performing a network entry procedure toward the target base station according to a handover procedure optimization flag; and a transceiver transmitting a ranging request message including indication information indicating direct handover to the target base station to the target base station and receiving a ranging response message including the handover procedure optimization flag from the target base station, wherein, in the network entry procedure, the controller performs a key agreement procedure with the target base station by using first authentication information which has been used in a connection with a serving base station.

To achieve these and other advantages and in accordance with the purpose of the present disclosure, as embodied and broadly described herein, there is also provided a target base station performing handover, including: a controller determining a handover procedure optimization flag according to whether or not security context of a terminal can be acquired from a serving base station, and performing a network entry procedure of the terminal according to the handover procedure optimization flag; and a transceiver receiving a ranging request message including indication information indicating direct handover to the target base station from the terminal and transmitting a ranging response message including the handover procedure optimization flag to the terminal, wherein, in the network entry procedure, the controller performs a key agreement procedure with the terminal by using first authentication information which has been used by the terminal in a connection with a serving base station.

According to the handover performing method and apparatus as described above, in performing handover from a legacy base station (e.g., an IEEE 802.16e base station) to an advanced base station (e.g., an IEEE 802.16m base station), a terminal authentication process is optimized to support both a handover procedure of an effective network reentry level and a handover procedure of a full network entry level, and a direct handover from a base station supporting only the existing system to a base station supporting only an advanced system can be effectively performed.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
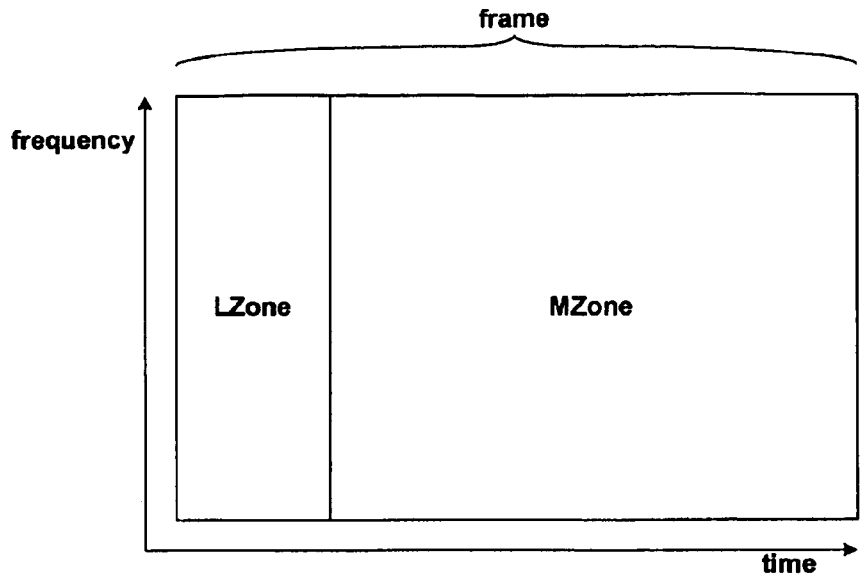
FIG. 1 is a conceptual view for explaining an LZone and MZone in an IEEE 802.16m system.

The exemplary embodiments of the present disclosure will now be described with reference to the accompanying drawings, in which like numbers refer to like elements throughout. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

Terms required for explaining exemplary embodiments of the present disclosure will now be described.

Communication System

A communication system according to an exemplary embodiment of the present disclosure refers to a multi-access system sharing the same radio resources as a frequency band to provide communication with multiple users. A multi-access scheme applied to the communication system according to an exemplary embodiment of the present disclosure includes TDMA (time division multiple access), FDMA (frequency division multiple access), CDMA (code division multiple access), OFDMA (orthogonal frequency division multiple access), SC-FDMA (single carrier frequency division multiple access), or any other conventional modulation techniques. Also, multi-access schemes for downlink and uplink transmissions may differ. For example, downlink may use an OFDMA scheme and uplink may use an SC-FDMA scheme.

The communication system according to an exemplary embodiment of the present disclosure is a system for providing various communication services such as voice, packet data, and the like, including a base station and a terminal. For example, the communication system according to an exemplary embodiment of the present disclosure may be an IEEE 802.16e/m system, a mobile WiMAX system, and the like. A communication system hereinafter is not limited to a particular system and an IEEE 802.16m system will be described as an example for the sake of clarification, and in this case, an IEEE 802.16e system is a legacy system of the IEEE 802.16m system.

Terminal

A terminal according to an exemplary embodiment of the present disclosure may be called by other names such as subscriber station (SS), user equipment (UE), mobile equipment (ME), mobile station (MS), etc., which includes a portable device having a communication function such as a mobile phone, a personal digital assistant (PDA), a smartphone, a laptop computer, and the like, or a non-portable device such as a personal computer (PC), a vehicle-mounted device, and the like. Hereinafter, a terminal supporting only the IEEE 802.16e system will be referred to as an 'YMS (legacY MS) and a terminal supporting the IEEE 802.16m system will be referred to as an 'AMS (Advanced MS)'. Here, the AMS may support the IEEE 802.16e system (legacy system) or may not.

Base Station

A base station according to an exemplary embodiment of the present disclosure refers to a fixed point communicating with a terminal, and may be called by other names such as eNB (evolved-NodeB), NB (NodeB), BS (base station), BTS (Base Transceiver System), access point, and the like. A single base station may provide a communication service with respect to at least one cell, and an interface for transmitting user traffic or control traffic may be used between base stations. Hereinafter, a base station supporting only the IEEE 802.16e system will be referred to as an 'YBS (legacY BS)' and a terminal supporting the IEEE 802.16m system will be referred to as an 'ABS (Advanced BS)'. Here, the ABS may support the IEEE 802.16e system (legacy system) or may not.

Context

In general, context refers to a series of attributes defining an environment of entities residing therein. Context may be created for the purpose of providing a particular service such as synchronization, transaction, just-in-time activation, security, and the like. Single context may include several entities.

In particular, security context may include information such as an identifier, a group identifier, a privilege, an access authority, a key, and the like, as data with respect to a user or a terminal.

Hereinafter, a handover performing method and apparatus capable of shortening a required time or delay time by optimizing a handover procedure between base stations of a terminal in a communication system according to exemplary embodiments of the present disclosure will now be described in detail with reference to FIGS. 1 to 5.

An introduction of a next-generation communication system accompanies a huge financial cost, so a common carrier naturally wants to gradually introduce a next-generation communication system while utilizing the legacy communication system to its maximum level. As a result, inter-operability of equipment supporting the legacy communication system and equipment supporting an advanced communication system is a key technical issue. For example, an advanced base station may perfectly support a legacy base station; in this case, however, because of a heavy burden for its cost, an advanced base station supporting only an advanced communication system may be installed according to circumstances.

In a case in which a legacy base station supporting only a legacy communication system and an advanced base station supporting only an advanced communication system coexist and a terminal moves from a cell of the legacy base station to a cell of the advanced base station, a method of processing handover is problematic.

In the following description, it is assumed that an IEEE 802.16e system is the legacy communication system and an IEEE 802.16m system is the advanced communication system. In this case, however, the IEEE 802.16e system and the IEEE 802.16m system are taken as examples to explain an exemplary embodiment of the present disclosure and the present disclosure is not limited thereto.

First, a procedure of performing handover by a terminal from the YBS to the ABS will now be described. Methods by which the terminal can perform handover from the YBS to the ABS can be classified into two types: one is handover through Zone Switch, and the other is direct handover (HO). The HO through Zone Switch may be used when the ABS supports the legacy communication system and the direct handover may be used when the ABS does not support the legacy communication system. The handover method through Zone Switch will now be described first hereinafter.

Handover Through Zone Switch

A resource zone of the ABS supporting the legacy system is divided into an LZone (legacy resource zone, IEEE 802.16e resource zone) supporting a legacy system and an MZone (IEEE 802.16m resource zone) supporting the IEEE 802.16m. The YMS operates in the LZone of the ABS and the AMS operates in the MZone of the ABS.

In order for the AMS to perform handover from the IEEE 802.16e network to the IEEE 802.16m network, the AMS must first perform handover to the LZone and then perform zone switching to the MZone of the target ABS. Zone switching is a procedure in which the AMS, which has operated in the LZone, operates in the MZone when the LZone and MZone discriminated by a time division duplexing (TDD) scheme in a single carrier. Namely, zone switching may be understood such that an IEEE 802.16e MAC operation has been performed and the IEEE 802.16m MAC operation is currently performed. Conversely, the case in which the AMS moves from the MZone to LZone can be understood in a similar manner. FIG. 1 is a conceptual view for explaining LZone and MZone in the IEEE 802.16m system.

The AMS and the target ABS must have some pieces of information in advance to perform zone switching. For example, at the AMS' stance, whether or not the target base station is the ABS must be known, and at the ABS' stance, whether or not the terminal is the AMS must be known, in order to perform scheduling to carry out corresponding handover or zone switching procedure. Also, the AMS must know about a zone to which it is going to move. For example, when the AMS moves from the LZone to the MZone, the AMS must receive system information (e.g., a superframe header (SFH)) with respect to the MZone and must know about a start position of the MZone.

The AMS may perform a network re-entry at the LZone of the target ABS, and the target ABS may instruct the AMS to switch the zone to the MZone during the network re-entry to the LZone or to switch the zone to the MZone after the network re-entry to the LZone is completed. Hereinafter, the case in which the AMS switches the zone to the MZone after completing network re-entry to the LZone will be described as an example. The case in which the AMS switches the zone to the MZone during the network re-entry to the LZone is similar and merely different in a time point at which the target ABS transmits an RNG-RSP message including a TLV (Type-Length-Value) to the AMS, so a detailed description thereof will be omitted.

Figure 2:
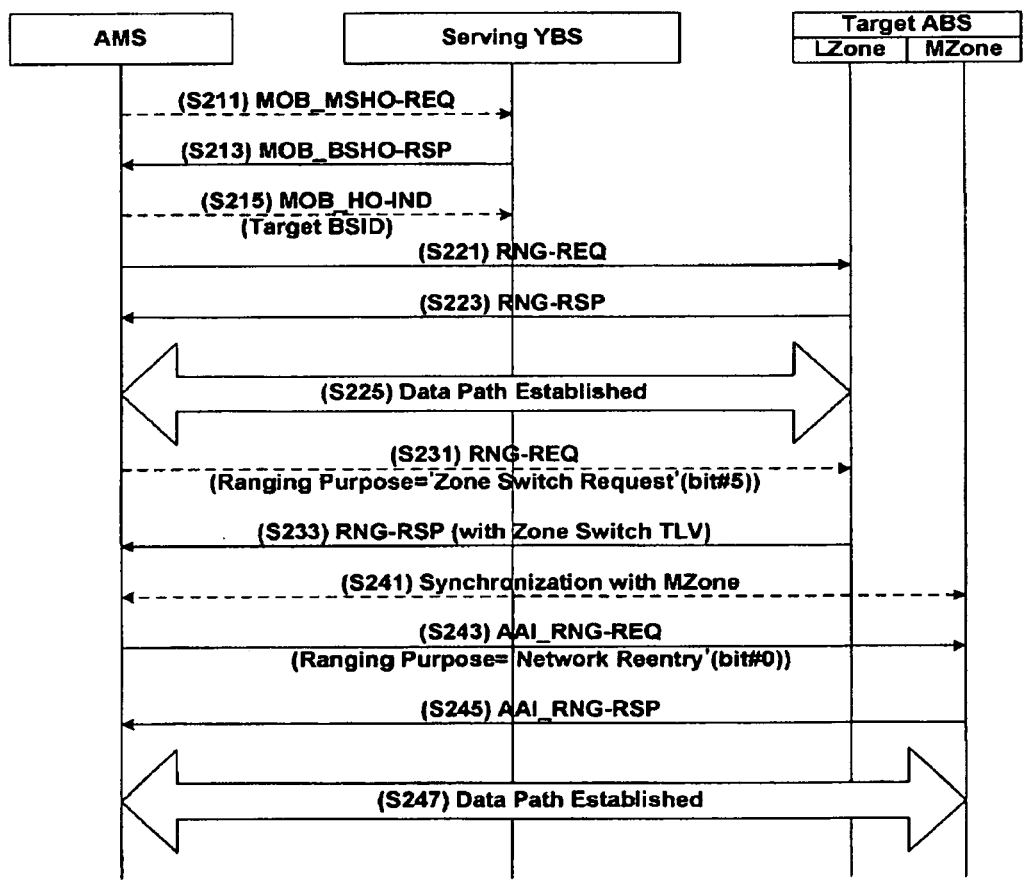
FIG. 2 is a signal flow chart illustrating a handover procedure through zone switching in performing handover from a base station supporting only an IEEE 802.16e system to a base station supporting only a IEEE 802.16m system.

FIG. 2 is a signal flow chart illustrating a handover procedure through zone switching in performing handover from a base station supporting only an IEEE 802.16e system to a base station supporting only an IEEE 802.16m system.

Handover may be initiated by the AMS or the serving YBS. For example, as shown in FIG. 1, when the AMS initiates handover, the AMS transmits a MOB_MSHO-REQ message to the serving YBS (S211), and the serving YBS transmits a MOB_BSHO-RSP message to the AMS (S213). The AMS may transmit a MOB_HO-IND message including a BSID of the target ABS as a parameter to the serving YBS (S215). Next, the AMS transmits an RNG-REQ message to the target ABS (S221) and receives an RNG-RSP message from the target ABS (S223), thus establishing a data transmission path in the LZone of the target ABS (S225).

Zone switching is initiated by the AMS or the target ABS, and a final zone switching is determined by the target ABS. The target ABS may instruct the AMS to switch the zone from the LZone to the MZone during the network re-entry to the LZone or after the network re-entry is completed.

When the AMS initiates zone switching, the AMS transmits an RNG-REQ message including a parameter (e.g., a bit #4 of a Ranging Purpose Indication is set to 1) designating zone switching to the target ABS (S231), and the target ABS transmits an RNG-RSP message including a zone switch TLV to the AMS in response (S233). And the AMS may match synchronization with respect to the MZone of the target ABS (S241). The AMS then transmits an AAI_RNG-REQ message including a parameter (e.g., a bit #0 of a Ranging Purpose Indication is set to 1) designating a network re-entry to the target ABS (S243) and the target ABS transmits an AAI_RNG-RSP to the AMS (S245), thus establishing a data transmission path in the MZone of the target ABS (S247).

The handover method through zone switching has been described. A direct handover method will now be described.

Direct Handover

Zone switching can be performed only in the target ABS supporting both the IEEE 802.16e system and the IEEE 802.16m system. Thus, like in a Greenfield mode, a procedure of performing handover from the YBS to the ABS supporting only the IEEE 802.16m system or a procedure handover from the ABS supporting only the IEEE 802.16m to the YBS is separately defined.

The AMS scans to check whether or not there is an ABS nearby through blind scanning and performs handover to the target ABS through an uncontrolled handover (HO) procedure (or an uncoordinated HO procedure) defied in the IEEE 802.16m standard. The blind scanning refers to scanning without being coordinated by the serving base station, which may possibly cause degradation of a quality of service (QoS) such as a lengthened interruption time or the like.

One of the most important tasks in handover is minimizing a delay time possibly generated while the handover procedure is carried out. However, when the AMS performs direct handover, the handover performed toward the target base station is handover without a coordination of a base station, lengthening a delay time. For example, when the AMS being served in the YBS performs handover to the ABS supporting only the IEEE 802.16m system, it is not coordinated by the YBS or the ABS, so the handover is not optimized.

Also, when the AMS performs handover to the ABS supporting only the IEEE 802.16m system, there is no method for requesting it from the YBS. For example, when the AMS initiates handover, a MOB_MSHO-REQ message does not support a message format for handover toward the ABS.

In addition, when the AMS performs network entry to the ABS supporting only the IEEE 802.16m system, the target ABS cannot authenticate the AMS, failing to provide an optimized handover procedure. The reason why the target ABS cannot authenticate the AMS is because a security scheme used for the IEEE 802.16e network and a security scheme (e.g., a security key derivation) used for the IEEE 802.16m network are different, so the ABS supporting only the IEEE 802.16m system is not capable of interpreting or authenticating authentication information the AMS has used in the relationship with the YBS.

As described above, in the direct handover, there is a difficulty in smoothly performing the uncontrolled handover procedure, so the ABS would prefer disconnection (or de-registration) from the serving base station and then performing an full network entry to the target base station to performing handover. Thus, the procedure of the full network entry level, rather than an optimized handover procedure, is performed each time on the ABS supporting only the IEEE 802.16m system, causing an ineffective situation that the delay time is lengthened.

Thus, to solve the problem, the present disclosure proposes a handover performing method capable of minimizing a handover delay time by optimizing the authentication process with respect to the terminal of the target base station by using pieces of authentication information which have been used in the relationship with the serving base station or by adjusting an authentication time point. As described above, the AMS scans an ABS supporting only the IEEE 802.16m system around the AMS through a method such as blind scanning or the like, and when the scanned ABS has a good signal state, the AMS can perform handover by designating the ABS as a target base station. In this case, the present disclosure proposes two methods for supporting the direct handover.

The first method is a direct handover method using a CMAC. In detail, when the AMS performs handover from the YBS to the ABS supporting only the IEEE 802.16m system, the authentication process of an extensible authentication protocol (EAP) is omitted by using cipher-based message authentication code (CMAC) information which has been previously used in the YBS in the network re-entry process, and identification information of the AMS is provided to thereby perform a network re-entry procedure or an initial network re-entry procedure of the normal IEEE 802.16m type.

The second method is a direct handover method without using the CMAC. In detail, when the AMS performs handover from the YBS to the ABS supporting only the IEEE 802.16m system, an authentication procedure is not performed in the network re-entry procedure, and when the network re-entry procedure is finished in a state that the ABS has received the identification information of the AMS, the terminal is finally authenticated in a key agreement procedure, and then a service is provided to the terminal.

In the first method, the terminal is authenticated during the network re-entry procedure, while in the second method, the terminal is authenticated after the network re-entry procedure. Hereinafter, the direct handover method without using the CMAC will now be described. In the following description, 'terminal' refers to the AMS, 'serving base station' is a base station currently providing a service to the terminal, as a base station supporting only the IEEE 802.16e system, and 'target base station' is a base station to which the terminal performs handover, as a base station supporting only the IEEE 802.16m system.

Direct Handover without Using CMAC

In a direct handover method using CMAC, on the assumption that the target base station supporting only the IEEE 802.16m system has a function of interpreting (decrypting) IEEE 802.16e CMAC information transmitted by the terminal, the target base station authenticates the terminal based on the CMAC information transmitted from the terminal, thus omitting the EAP authentication process and a privacy key management (PKM) authentication process in the network reentry initial process (in which the terminal and the target base station transmit and receive AAI_RNG-REQ/RSP message).

However, although the EAP authentication process and the PKM authentication process are omitted, the terminal must necessarily perform a key agreement procedure in order to generate a key for an IEEE 802.16m system required for its connection to the target base station. A handover method (namely, the direct handover method not using CMAC) according to an exemplary embodiment of the present disclosure is based upon such recognition that, when the key agreement procedure is normally performed, it may be indirectly confirmed that the terminal has been normally authenticated, so it is not necessary to authenticate the terminal through the CMAC information in the network reentry initial process. Namely, a terminal authentication is deferred up to the step of the key agreement procedure. In this case, however, in order to defer the terminal authentication up to the step of the key agreement procedure, the target base station must be able to receive context (e.g., static or dynamic context including security context) of the terminal from a previous serving base station of the terminal.

Figure 3:
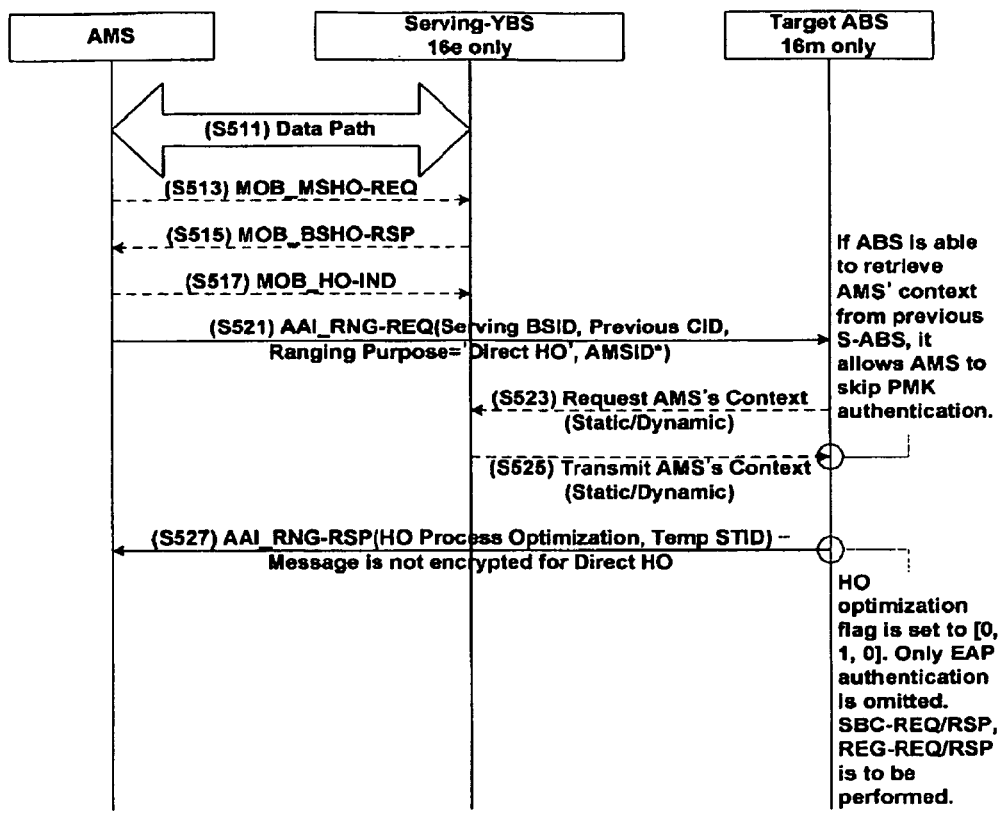
FIGS. 3 and 4 are flow charts illustrating the process of a handover performing method (i.e., direct handover without using a CMAC) according to an exemplary embodiment of the present disclosure.
Figure 4:
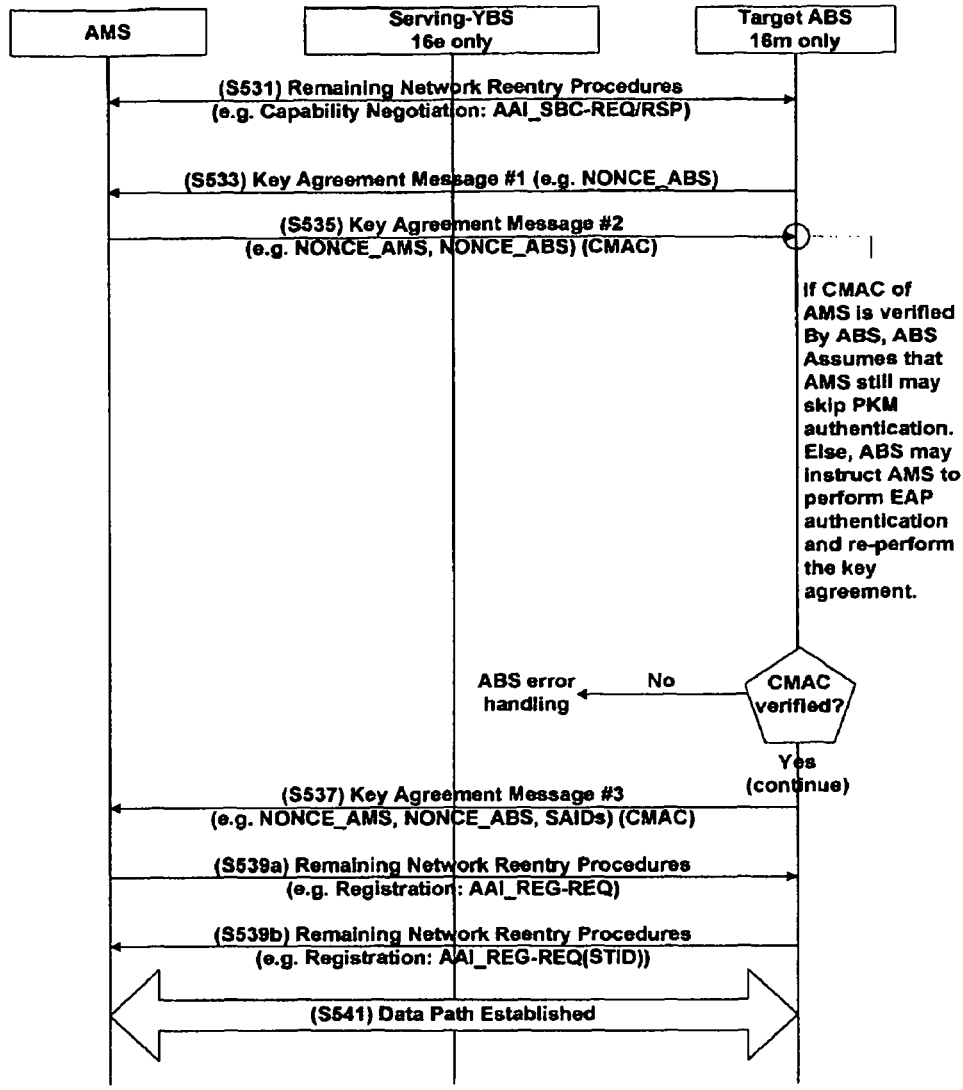

FIGS. 3 and 4 are flow charts illustrating the process of a handover performing method (i.e., direct handover without using a CMAC) according to an exemplary embodiment of the present disclosure.

As shown in FIG. 3, while the terminal is transmitting and receiving data along a data transmission path set in the relationship with the serving base station (step S511), the terminal may search for a base station that supports only the IEEE 802.16m system among base stations nearby. When the terminal requests handover by transmitting a MOB_MSHO-REQ message to the serving base station (step S513), the serving base station transmits a MOB_BSHO-RSP message in response (step S515). The terminal may transmit MOB_HO-IND including BSID information of the target base station as a parameter to the serving base station to request for handover to the target base station from the serving base station (step S517). In this case, however, when the communication system including the serving base station and the target base station does not define a process of adjusting handover of the terminal between serving base station and the target base station, steps S313 to S317 may be omitted.

Next, the terminal attempts network reentry to the target base station. The terminal, sending an AAI_RNG-REQ message to the target base station, requests direct handover (step S521), and in this case, the terminal includes several kinds of information required for performing the direct handover procedure in the AAI_RNG-REQ message and transmits the same.

For example, the terminal may include a parameter (e.g., setting a bit #8 of Ranging Purpose Indication as 1) designating direct handover, a BSID (e.g., serving BSID) of the previous serving base station, and a CID (e.g., a previous CID) used for the connection with the previous serving base station, and the like, in the AAI_RNG-REQ message. The terminal may include terminal identification information (e.g., AMSID*) of the IEEE 802.16m system in the AAI_RNG-REQ message.

The AAI_RNG-REQ message transmitted by the terminal does not include information according to which the target base station performs EAP authentication on the terminal, but include identity information of the terminal such as the BSID (e.g., the serving BSID) of the previous serving base station and the CID (e.g., the previous CID) which was used for the connection with the previous serving base station. The target base station attempts receiving context of the terminal from the previous serving base station of the terminal by using the identity information of the terminal.

The target base station transmits an AAI_RNG-RSP message in response to the AAI_RNG-REQ message, which has transmitted by the terminal, to the terminal (step S527). The AAI_RNG-RSP message transmitted by the target base station may include a parameter (e.g., HO Process Optimization) designating the procedure that may be omitted when the terminal reenters the network, a parameter (e.g., temporary STID) designating a temporary terminal identifier used between the terminal and the target base station, and the like. Until this point in time, the PKM (Privacy Key Management) for security between the terminal and the target base station has not bee set, so the AAI_RNG-RSP message has not been encrypted.

When the target base station is able to receive the context of the terminal from the previous serving base station of the terminal by using the identity information of the terminal (step S523, step S525), the target base station sets such that some bits of the parameter (e.g., (e.g., HO Process Optimization) designating the procedure that may be omitted when the terminal reenters the network can be omitted. For example, the target base station may notify the terminal that the PKM authentication procedure (namely, the authentication procedure of the terminal) of the terminal can be omitted. In detail, when an AAI_SBC-REQ/RSP message exchange procedure and an AAI_REG-REQ/RSP message exchange procedure cannot be omitted and the PKM authentication procedure can be omitted, the target base station sets bit #0 and bit #2 of the HO Process Optimization parameter as 0 and bit #1 as 1.

When the target base station is not able to receive the context of the terminal from the previous serving base station of the terminal by using the identity information of the terminal, the target base station may sets such that the entire bits of the parameter (e.g., HO Process Optimization) designating the procedure that may be omitted when the terminal reenters the network cannot be omitted. Namely, the target base station may notify the terminal that it should perform the full network entry procedure or the entire network reentry procedure including the PKM authentication procedure of the terminal. In detail, when all of the AAI_SBC-REQ/RSP message exchange procedure, the AAI_REG-REQ/RSP message exchange procedure, and the PKM authentication procedure cannot be omitted, the target base station sets all of the bit #0, bit #1, and bit #2 of the HO Process Optimization parameter as 0.

After the target base station transmits the AAI_RNG-RSP message to the terminal, the remaining network reentry procedure is performed. In particular, the terminal and the target base station perform the PKM procedure for security, and the PKM procedure includes a process of agreeing with a key used for authenticating a transmitted or received message or encrypting data (key agreement, steps S533 to S537).

The process of key agreement for the IEEE 802.16m system includes a procedure of exchanging a random number (NONCE_ABS, NONCE_AMS) between the terminal and the target base station (steps S533 to S537). When the target base station transmits a key agreement message including NONCE_ABS to the terminal (step S533), the terminal transmits a key agreement message including NONCE_AMS, NONCE_ABS and CMAC information generated based on the NONCE_AMS, NONCE_ABS to the target base station (step S537).

When the authentication of the received CMAC information is successful, the target base station transmits a key agreement message including NONCE_AMS, NONCE_ABS, SAID (security association identifier), the generated CMAC information, and the like, to the terminal, thus completing the key agreement procedure (step S537).

Here, the SAID is an identifier with respect to a security association (SA) to which each TEK (traffic encryption key, transport encryption key) belongs, and here, the security association (SA) refers to a set of information required for security communication between a base station and a terminal. Namely, which security type of service can be received can be know by using the SAID. For example, when the SAID is 0x01, it means all of unicast control and transport flow are encrypted (namely, AES-CCM mode is applied), and when the SAID is 0x02, it means that only a unicast transport flow is encrypted (namely, AES-CTR mode is applied).

When the authentication of the received CMAC information fails, the target base station regards it as a failure of the EAP authentication of the terminal and enters a base station error handling state. In the base station error handling state, the target base station may perform various operations, and one of them is transmitting a command instructing performing of EAP authentication to the terminal. In detail, the target base station may transmit an AAI_RNG-RSP message including the HO Process Optimization parameter having the bit #1 set as 1 to the terminal to issue a command instructing performing of the PKM authentication from the beginning.

Also, the terminal and the target base station may negotiate about the function (or capability) that can be supported or is desired to be used by the terminal or that can be supported or allowed by the target base station through the AAI_SBC-REQ message and the AAI_SBC-RSP message (capability negotiation, step S531). Or, the terminal performs registration to the network of the target base station through the AAI_REG-REQ message and the AAI_REG-RSP message to complete the network reentry procedure (registration, steps S539a and S539b). Here, the AAI_REG-RSP message is encrypted and the STID is included in the AAI_REG-RSP message and transmitted.

After the network reentry procedure is completed, the terminal transmits and receives data along the data transmission path set in the relationship with the target base station (step S541).

Figure 5:
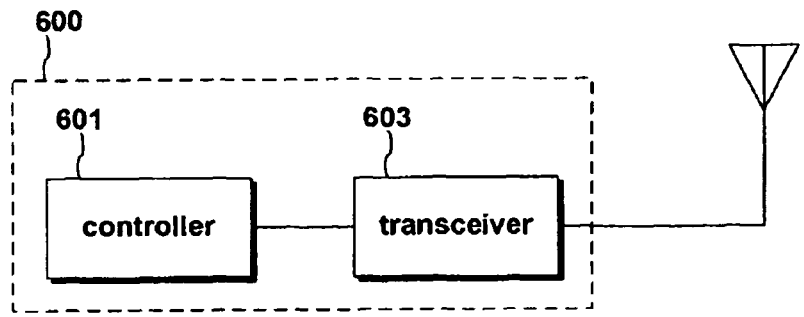
FIG. 5 is a schematic block diagram of a handover performing apparatus according to an exemplary embodiment of the present disclosure.

FIG. 5 is a schematic block diagram of a handover performing apparatus according to an exemplary embodiment of the present disclosure.

The handover performing apparatus 600 according to an exemplary embodiment of the present disclosure includes a controller 601 and a transceiver 603. The handover performing apparatus 600 according to an exemplary embodiment of the present disclosure may be a terminal or a base station. Hereinafter, first, the case in which the handover performing apparatus 600 according to an exemplary embodiment of the present disclosure is a terminal will be taken as an example in the following description.

The controller 601 transmits a control signal for controlling a general operation of the transceiver 603.

The controller 601 acquires information regarding a target base station through scanning, selects a target base station, and performs a network entry procedure toward the target base station according to a handover procedure optimization flag.

The transceiver 603 transmits a ranging request message including indication information indicating direct handover to the target base station, to the target base station, and receives a ranging response message including the handover procedure optimization flag from the target base station.

Next, the case in which the handover performing apparatus 600 according to an exemplary embodiment of the present disclosure is a target base station will be taken as an example in the following description.

The controller 601 transmits a control signal for controlling a general operation of the transceiver 603.

The controller 601 determines a handover procedure optimization flag according to whether or not it can acquire security context of the terminal from a serving base station, and performs a network entry procedure of the terminal toward the target base station according to the handover procedure optimization flag.

The transceiver 603 receives a ranging request message including indication information indicating direct handover from the target base station, transmits a ranging response message including the handover procedure optimization flag to the terminal.

The controller 601 and the transceiver 603 when the handover performing apparatus 600 according to an exemplary embodiment of the present disclosure is the terminal or the base station can be understood in a similar manner as those described above with reference to FIGS. 1 to 4 in explaining the handover performing method according to an exemplary embodiment of the present disclosure, so its detailed description will be omitted.

The handover performing apparatus according to an exemplary embodiment of the present disclosure may include hardware, software, a recording medium, for example, an output device (display device, speaker, etc.), an input device (touch screen, keypad, microphone, etc.), a memory, and a processor, required for implementing the technical idea of the present disclosure, besides the foregoing elements. The constituents are obvious to the skilled person in the art, so its detailed description will be omitted.

The handover performing apparatus according to an exemplary embodiment of the present disclosure may be implemented by hardware, software, a computer-readable recording medium, and some combination thereof. For a hardware implementation, the handover performing apparatus according to an exemplary embodiment of the present disclosure may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the handover performing apparatus according to an exemplary embodiment may be implemented as at least one module performing the respective functions or respective operations as described above. The module may be implemented by a software code created in a proper program language, and the software code may be stored in a memory and executed by a processor. The memory or the processor may be various units well known to the skilled person in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for performing handover by a terminal, the method comprising:
  acquiring information regarding a target base station through scanning;
  transmitting, to the target base station, a ranging request message including indication information indicating direct handover;
  receiving, from the target base station, a ranging response message including a handover procedure optimization flag as a response to the ranging request message, wherein the handover procedure optimization flag is set to perform a key agreement procedure, wherein the key agreement procedure is performed by using first authentication information which has been used in a connection with a serving base station; and
  receiving, from the target base station, a first key agreement message including a random number of the target base station;
  transmitting, to the target base station, a second key agreement message including the first authentication information, the random number of the target base station and a random number of the terminal; and
  receiving, from the target base station, a third key agreement message including second authentication information generated by the target base station, the random number of the target base station and the random number of the terminal.

2. The method of claim 1, wherein, in the key agreement procedure, the terminal includes the first authentication information in the second key agreement message transmitted to the target base station, and the target base station authenticates the terminal based on the first authentication information.

3. The method of claim 2, wherein the first authentication information is a cipher-based message authentication code (CMAC) tuple generated by the random number of the target base station and the random number of the terminal, wherein the second authentication information is a CMAC tuple generated by the target base station.

4. The method of claim 1, wherein, in the key agreement procedure, when the target base station cannot acquire a security context of the terminal from the serving base station and when the target base station cannot authenticate the terminal according to the first authentication information, a full network entry procedure with the target base station is performed, and when the target base station can acquire the security context of the terminal from the serving base station and when the target base station can authenticate the terminal according to the first authentication information, a network reentry procedure with the target base station is performed.

5. The method of claim 1, wherein the third key agreement message further comprises a security association identifier (SAID) identifying the type of security communication between the terminal and the target base station.

6. The method of claim 1, wherein the handover procedure optimization flag is set based on whether or not the target base station can acquire the security context of the terminal from the serving base station.

7. The method of claim 6, wherein the handover procedure optimization flag is set to perform the key agreement procedure with the target base station when the target base station cannot acquire the security context of the terminal from the serving base station, wherein the handover procedure optimization flag is set to omit an authentication process according to an extensible authentication protocol (EAP) when the target base station can acquire the security context of the terminal from the serving base station.

8. The method of claim 1, wherein, in the key agreement procedure, at least one of a capability negotiation for negotiating about the capability which is supported or used by the terminal, a capability negotiation for negotiating about the capability which can be supported or allowed by the target base station, and a registration to the network of the target base station is performed.

9. The method of claim 1, wherein the serving base station is a base station supporting only an IEEE 802.16e system, wherein the target base station is a base station supporting only an IEEE 802.16m system.

10. A terminal performing handover, the terminal comprising:
  an RF (radio frequency) unit transmitting and receiving a radio signal; and
  a processor connected with the RF unit, wherein the processor is configured to:
    acquire information regarding a target base station through scanning;
    transmit, to the target base station, a ranging request message including indication information indicating direct handover,
    receive, from the target base station, a ranging response message including a handover procedure optimization flag as a response to the ranging request message, wherein the handover procedure optimization flag is set to perform a key agreement procedure, wherein the key agreement procedure is performed by using first authentication information which has been used in a connection with a serving base station,
    receive, from the target base station, a first key agreement message including a random number of the target base station, transmit, to the target base station, a second key agreement message including the first authentication information, the random number of the target base station and a random number of the terminal,
receive, from the target base station, a third key agreement message including second authentication information generated by the target base station, the random number of the target base station and the random number of the terminal.

* * * * *